United States Patent
Mahrenholz

(10) Patent No.: US 11,572,912 B2
(45) Date of Patent: Feb. 7, 2023

(54) EXPANSION ANCHOR AND METHOD OF MAKING AN EXPANSION ANCHOR

(71) Applicant: BLACK & DECKER INC., New Britain, CT (US)

(72) Inventor: Philipp Mahrenholz, Idstein (DE)

(73) Assignee: BLACK & DECKER INC., New Britain, CT (US)

( * ) Notice: Subject to any disclaimer, the term of this patent is extended or adjusted under 35 U.S.C. 154(b) by 128 days.

(21) Appl. No.: 17/009,209

(22) Filed: Sep. 1, 2020

(65) Prior Publication Data
US 2021/0062845 A1  Mar. 4, 2021

(30) Foreign Application Priority Data
Sep. 3, 2019  (GB) ...................................... 1912633

(51) Int. Cl.
*F16B 13/06*  (2006.01)
*B23K 31/02*  (2006.01)

(52) U.S. Cl.
CPC ............ *F16B 13/065* (2013.01); *B23K 31/02* (2013.01)

(58) Field of Classification Search
CPC .... F16B 13/061; F16B 13/065; F16B 13/066; B23K 31/02
See application file for complete search history.

(56) References Cited

U.S. PATENT DOCUMENTS

| | | | |
|---|---|---|---|
| 2,377,077 A * | 5/1945 | Gay | F16B 13/066 411/75 |
| 4,269,106 A * | 5/1981 | Leibhard | F16B 13/061 411/34 |
| 7,857,564 B2 | 12/2010 | Wieser | |
| 9,631,661 B2 * | 4/2017 | Vivier | F16B 29/00 |
| 2008/0050195 A1 * | 2/2008 | Wieser | F16B 13/065 411/44 |
| 2021/0062844 A1 * | 3/2021 | Frensemeier | F16B 13/065 |
| 2021/0231150 A1 * | 7/2021 | Shimahara | F16B 13/065 |

FOREIGN PATENT DOCUMENTS

| | | | |
|---|---|---|---|
| CN | 108679061 A | 10/2018 | |
| GB | 1466917 A * | 3/1977 | ............ F16B 13/065 |
| JP | 2004116128 A * | 4/2004 | |

OTHER PUBLICATIONS

Hosokawa, Y; 2004; JP2004-116128 A Machine Translation (Year: 2004).*
Search Report dated Feb. 19, 2020 from corresponding GB Patent Application No. 1912633.3.

* cited by examiner

*Primary Examiner* — Lee A Holly
(74) *Attorney, Agent, or Firm* — Kofi A. Schulterbrandt

(57) ABSTRACT

A method of making an expansion anchor comprising the steps of: providing a metal rod having a thread along at least part of its outer surface; adapting the metal rod to obtain a required length of metal rod; welding an expansion section to an end of the obtained length of metal rod; and providing an expansion sleeve which in use interacts with the expansion section for increasing the expansion sleeve diameter. An expansion anchor comprising a threaded rod part, an expansion section welded to an end of the rod part and an expansion sleeve which in use interacts with the expansion section for increasing the diameter of the expansion sleeve.

11 Claims, 3 Drawing Sheets

EXPANSION ANCHOR AND METHOD OF MAKING AN EXPANSION ANCHOR

CROSS-REFERENCE TO RELATED APPLICATIONS

This application claims priority from GB Patent Application No. 1912633.3, filed Sep. 3, 2019 the disclosures of which is incorporated herein by reference in its entirety.

FIELD OF THE INVENTION

This specification concerns expansion anchors for securing objects to concrete.

BACKGROUND OF THE INVENTION

Expansion anchors are known in the art, for example U.S. Pat. No. 7,857,564.

An expansion anchor 1 in FIG. 1 has a threaded rod 2, one end of which includes an expansion feature 3 which is typically conical. An expansion sleeve 4 is provided between a shoulder 5 of the threaded rod 2 and the expansion feature 3. In use the expansion anchor 1 is inserted through a hole in an object to be secured to a concrete surface. The expansion feature 3 is then fed into a hole in the concrete surface having a width similar to the expansion sleeve 4. The expansion anchor 1 may need to be hit with a hammer to insert it into the hole because of friction arising between the concrete and the expansion sleeve 4. Next a washer 6 and nut 7 are provided on the threaded rod 2 extending from the hole. Tightening the nut 7 causes it to ride along the threads of the threaded rod 2, which urges the washer 6 against the object to be fixed and causes the threaded rod 2 to be pulled in a direction out of the hole. Since the expansion sleeve 4 is maintained in place due to friction between it and the concrete, continued tightening of the nut 7 causes the expansion element 3 to be drawn into the expansion sleeve 4. Due to the conical shape of the expansion element 3 this causes the expansion sleeve to deform and urge with increasing force against the concrete to increase pull-out strength of the expansion anchor 1. Eventually a configuration will result where the object is firmly clamped between the concrete surface and the washer 6, the deformed expansion sleeve 4 firmly pressing against the interior surface of the hole so the expansion anchor 1 is secured to the concrete within acceptable limits of pull-out strength.

Different applications require different lengths of threaded rod 2. For a particular object to be fixed to a concrete surface the threaded rod 2 of the expansion anchor 1 should not be too long or too short. If it is too long then even though the expansion sleeve 4 of the expansion anchor 1 is capable of reaching a minimum embedment depth in a hole, after the object has been suitably clamped to the concrete in the manner described there remains an excess length of threaded rod 2 protruding above the object. This can look unsightly, be unsafe for example if the object is clamped on the floor due to an increased risk of passers by tripping and can cause other problems, for example getting in the way of other fixtures on a building site thereby requiring the excess length of threaded rod 2 to be cut away which involves further steps but can also leave sharp edges behind which are also a safety concern. On the other hand, if the threaded rod 2 of an expansion anchor 1 is too short the anchor will simply not be long enough to be embedded to the aforementioned minimum embedment depth while leaving sufficient length of threaded rod 2 protruding above the object to be secured for the washer 6 and nut 7 to be attached.

Construction companies or distributors must therefore stock expansion anchors 1 of different lengths in order to fix a range of objects of different thicknesses to concrete depending on the specific job at hand. It will be appreciated that inventory management involves a degree of prediction and so a company may inadvertently stock too many expansion anchors 1 of a particular length (because that length is not required as often as predicted) or too few expansion anchors 1 of a particular length (because that length is required more often than predicted, meaning that projects may undesirably be put on hold while new stock is ordered). If one or more companies overstocks on certain types of expansion anchors 1 it will be appreciated that this is not environmentally friendly since raw materials have been wasted making expansion anchors that are not being used and may not be so for quite some time.

Aspects of the invention have been conceived with the foregoing in mind.

BRIEF SUMMARY OF THE INVENTION

The present specification discloses a method of making an expansion anchor that includes the steps of: providing a metal rod having a thread along at least part of its outer surface; adapting the metal rod to obtain a required length of metal rod; wekding an expansion section to an end of the obtained length of metal rod; and providing an expansion sleeve which in use interacts with the expansion section for increasing the expansion sleeve diameter.

BRIEF DESCRIPTION OF THE DRAWINGS

Various aspects and embodiments of the invention will now be described by way of non-limiting example with reference to the accompanying drawings, in which.

DETAILED DESCRIPTION OF THE PREFERRED EMBODIMENT

Figure 1:
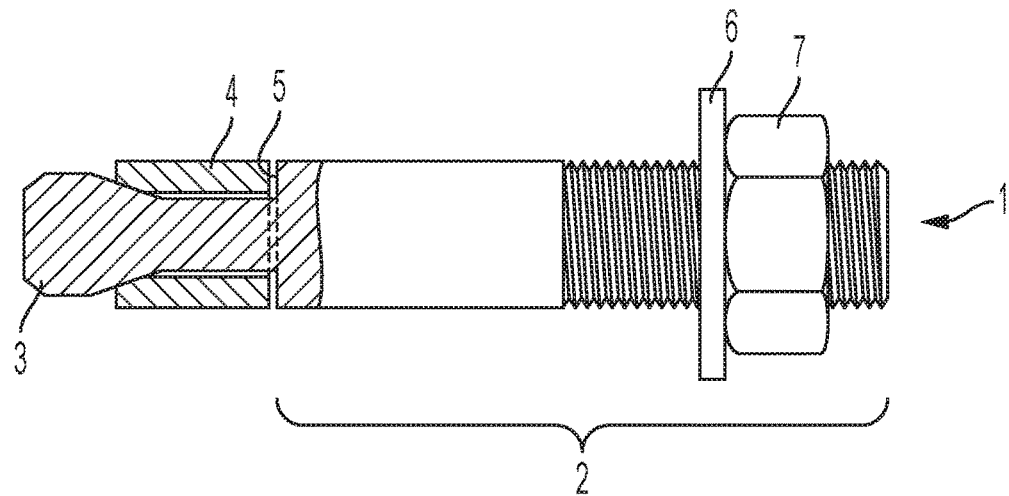
FIG. 1 is a partially cross-sectional illustration of a prior art expansion anchor.
Figure 2:
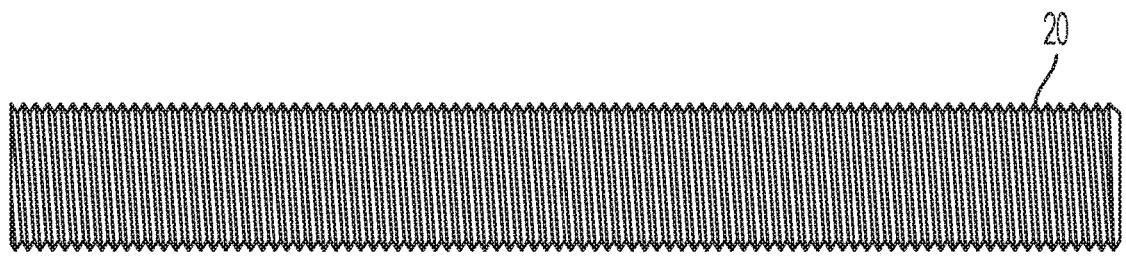
FIG. 2 illustrates a threaded rod.
Figure 3:
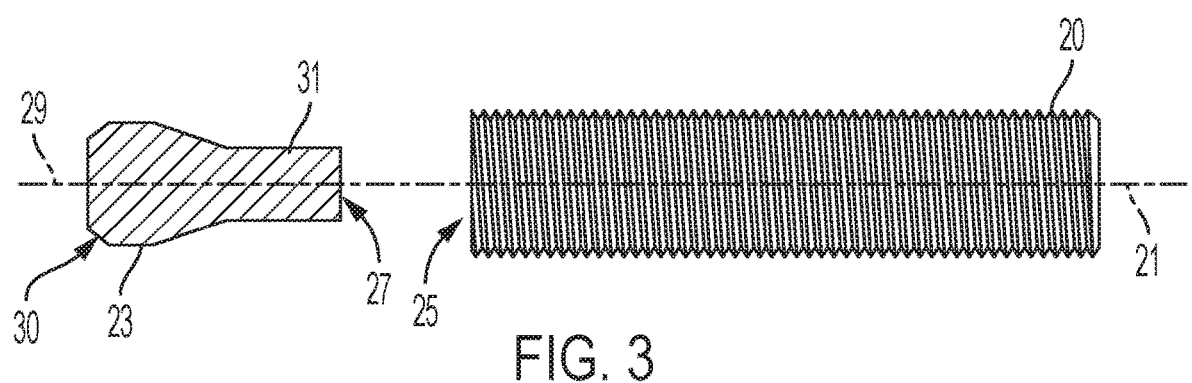
FIG. 3 illustrates a specific length of threaded rod adjacent an expansion part.

According to a method of forming an expansion anchor a threaded rod 20 is provided as shown in FIG. 2, the rod having a thread along its outer surface. In a next step the threaded rod is adapted, for example cut, to a predetermined length. An expansion part 30 is then welded to an end of the threaded rod 20 such that an axis 29 extending along the length of the expansion part 30 is parallel with an axis 21 extending along the length of the threaded rod 20, as illustrated by comparing FIGS. 3 and 4. The expansion part 30 has a conical expansion section 23 and a neck section 31. The expansion part 30 does not need to have a specific shape and the expansion section 23 can for example embody the shape of a known part such as the conical shaped expansion section in U.S. Pat. No. 7,857,564. Welding of the expansion part 30 to the threaded rod 20 provides that an annular shoulder 50 is provided adjacent the interface between the expansion part 30 and the threaded rod 20. An expansion sleeve 40 is additionally provided around the expansion part 30 as shown in FIG. 5 which is caused to deform by movement of the conical expansion section 23 into the expansion sleeve 40 during use of the expansion anchor 10. Persons skilled in the art will be familiar with suitable techniques for providing the expansion sleeve 40 in place during manufacture. A washer 60 and nut 70 can then be located on the threaded rod 20, whereby the anchor 10 formed can be subsequently used in the manner heretofore described.

Various specific welding techniques are suitable for implementing the welding step including resistance welding or solid-state welding for example friction welding. It will be appreciated that ideally an end face 27 of the expansion part 30 and an end face 25 of the threaded rod 20 which engage during the welding process should be substantially flush with each other when brought into contact. An example suitable welding machine can be purchased from the company August Strecker GmbH & Co. KG with registered office at Jahnstrasse 5, D-65549 Limburg, Germany.

Figure 4:
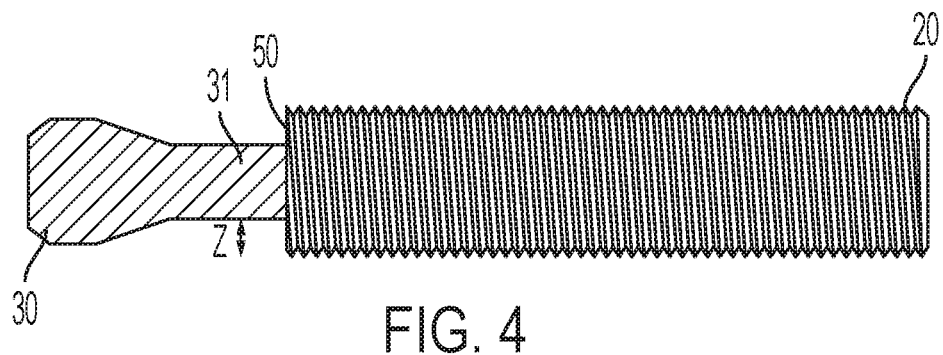
FIG. 4 illustrates the threaded rod and expansion part welded together.
Figure 5:
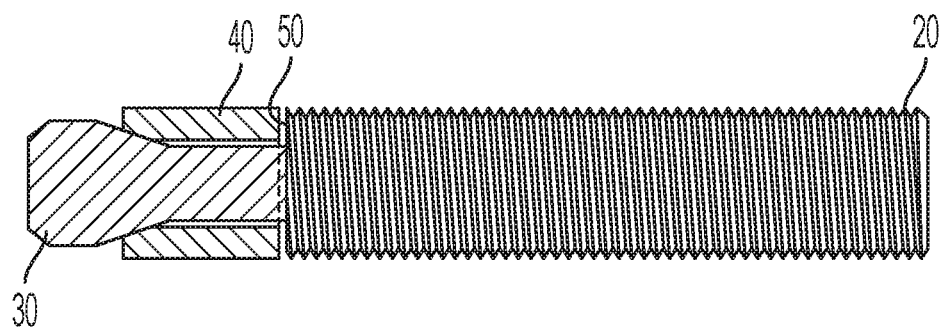
FIG. 5 illustrates the arrangement in FIG. 4 additionally with an expansion sleeve.
Figure 6:
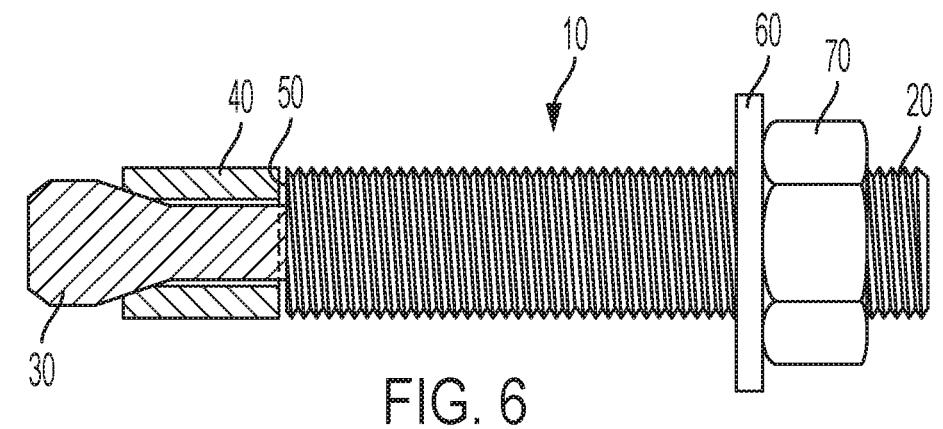
FIG. 6 illustrates the arrangement in FIG. 5 additionally with a washer and nut.

In the method of forming an expansion anchor heretofore described, with reference to FIG. 4, at the interface between the expansion part 30 and the adapted threaded rod 20 the expansion part 30 is thinner than the threaded rod 20. In other words the neck section 31 of the expansion part 30 has a smaller diameter than the major diameter of the threaded rod 20. In some embodiments the ratio of the major diameter of the threaded rod 20 to the neck section diameter can range from 1:0.5 to 1:0.9 for example and could be in particular 1:0.55, 1:0.77 or 1:0.89. This provides a gap denoted Z in FIG. 4 between the outer surface of the aforementioned neck section 31 and the top of the threads of the threaded rod 20. This provides some flexibility during the manufacturing process in that welding flash (material comprising the weld connection between the expansion part 30 and the threaded rod 20, for instance excess weld material and/or melted sections of the expansion part 30 and the threaded rod 20) can occupy space within the gap denoted Z in FIG. 4 and not protrude beyond the threads of the threaded rod 20. Therefore such welding flash does not protrude beyond the outer diameter of the expansion sleeve 40 which would otherwise have prevented the anchor 10 from being inserted into a hole in a concrete surface (bearing in mind that the diameter of a hole drilled into concrete is carefully controlled to closely correspond with the outer diameter of the expansion sleeve 40). Excess welding flash protruding beyond the outer diameter of the expansion sleeve 40 would need to be removed before an anchor 10 could be used. Keeping welding flash within the gap Z provides that after the welding step it is not necessary to perform an additional manufacturing step involving removing welding flash.

In some embodiments the threaded rod 20 and expansion part 30 are formed from the same type of metal. For example they can both be formed of steel such as stainless steel or carbon steel.

The expansion sleeve 40, the washer 60 and the nut 70 are also formed of metal and can additionally be made of the same type of metal as the other parts of the expansion anchor 10 or alternatively can be formed of a different type of metal to at least one of the threaded rod 20 and the expansion part 30.

Techniques for forming the respective components heretofore described such as the threaded rod 20, the expansion part 30 and the expansion sleeve 40 are known in the art, however, the inventor has not seen any instance where the expansion part 30 of an expansion anchor 10 is welded to a threaded rod section 20 of the anchor.

Forming expansion anchors according to the heretofore described method has multiple advantages. Expansion anchors can be made on demand to the specific lengths required by users, meaning optimised results will be realised in use (e.g. reduced excess length of threaded rod section protruding after a securing operation). The burden of inventory management is reduced in the sense that manufacturers do not need to predict how many anchors of different specific lengths will be required over the coming business period. In particular manufacturers no longer need to create X number of anchors of a first specific length and Y number of anchors of a second specific length, potentially resulting in too many or too few anchors being formed of a specific length. Instead anchors can be made to customised lengths on demand. In particular manufacturers can stock multiple pre-made expansion parts 30 and weld them to customised lengths of threaded rod 20 on demand to form customised anchors 10. By extension it will be realised that this addresses the problem of improving environmental friendliness of the overall manufacturing process because it maximises the efficiency of raw material use and reduces the likelihood of manufactured anchors ultimately not being used and simply sitting in a stock room.

It will be realised from the foregoing that the teachings herein are applicable to different thicknesses of anchors. If a thicker anchor is required, a thicker threaded rod 20 (having a thicker minor diameter) will be welded to a thicker expansion part 30. If a thinner anchor is required, a thinner threaded rod 20 (having a thinner minor diameter) will be welded to a thinner expansion part 30. Furthermore, threaded rods of different specifications may be selected depending on the end application, in particular a manufacturer may stock multiple threaded rods of a particular thickness but each having a different thread pitch, thread height and/or thread profile. As such a threaded rod of the required thread specification will be used in manufacturing.

Figure 7:
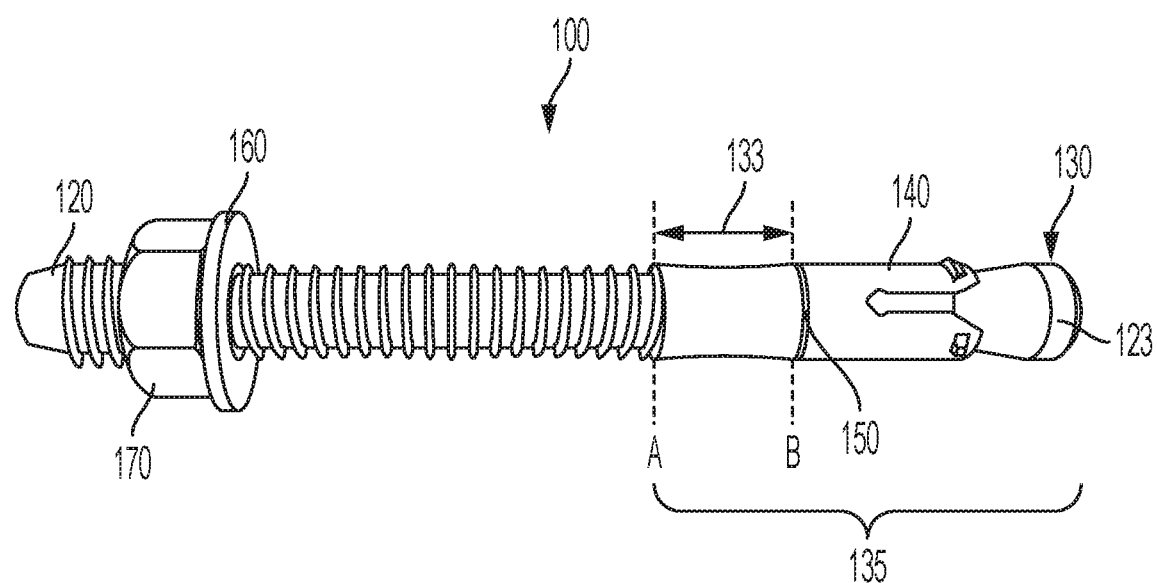
FIG. 7 illustrates a threaded rod according to another embodiment.

Another embodiment is described with reference to FIG. 7, wherein all like components are denoted with similar reference numerals increased by 100. In this embodiment the weld is not located between the expansion part 130 and the threaded rod 120 at location B (like in the previous embodiment) but instead the weld is located at location A. In this embodiment therefore the neck section of the expansion part 130 is integral with a rod-like spacer section 133 having a greater diameter than the neck section. The spacer section 133 has a diameter substantially equal to the major diameter or the minor diameter of the threaded rod 120. The annular shoulder 150 is formed at the location between the spacer section 133 and the neck section of the expansion part 130. The combination of the expansion part 130 (including the expansion section 123, neck section and spacer section 133) and the expansion sleeve 140 collectively comprise an expansion portion 135 which can be mass produced and welded to a threaded rod 120 having a pre-selected length and thread specification on demand.

According to a method of forming an expansion anchor 100 a threaded rod can be adapted, for example cut, to a predetermined length. An expansion portion 135 of the kind described in the foregoing paragraph is then welded to an end of the threaded rod 120 such that an axis extending along the length of the expansion portion 135 is parallel with an axis extending along the length of the threaded rod 120. The expansion portion 135 does not need to have a specific shape and can embody a known configuration of expansion section 123 and expansion sleeve 140. A washer 160 and nut 170 can then be located on the threaded rod 120, whereby the anchor 100 formed can be subsequently used in the manner heretofore described.

As with the previous embodiment various specific welding techniques are suitable for implementing the welding step including resistance welding or solid-state welding for example friction welding. It will be appreciated that ideally an end face of the spacer section 133 and an end face of the threaded rod 120 which engage during the welding process should be substantially flush with each other when they are brought into contact. This embodiment however could potentially require the additional manufacturing step of removing welding flash (material comprising the weld connection between the spacer section 133 and the threaded rod 120, for instance excess weld material and/or melted sections of the spacer section 133 and the threaded rod 120) so that such welding flash does not protrude above the outer diameter of the expansion sleeve 140 for reasons already explained. This additional manufacturing step can for example involve filing away unwanted welding flash.

According to a further embodiment an expansion portion 135 of the kind heretofore described can be welded to a threaded rod 120, wherein the diameter of the spacer section 133 of the expansion portion 135 is less than the minor diameter of the threaded rod 120. This results in an anchor having a gap (similar to the gap Z in FIG. 4) between the outer diameter of the spacer section 133 of the expansion portion 135 and the top of the threads of the threaded rod 120. Accordingly the advantages can be realised that were heretofore discussed in connection with the first embodiment, involving maintaining welding flash within the gap below the top of the threads and not needing to perform an additional manufacturing step removing excess material.

It will be appreciated that whilst various aspects and embodiments have heretofore been described, the scope of the present invention is not limited thereto and instead extends to encompass all methods and arrangements, and modifications and alterations thereto, which fall within the spirit and scope of the appended claims.

The invention claimed is:

1. A method of making an expansion anchor comprising the steps of:
providing a metal rod having a thread along at least part of its outer surface; adapting the metal rod to obtain a required length of metal rod; welding an expansion section to an end of the obtained length of metal rod; and providing an expansion sleeve which in use interacts with the expansion section for increasing the expansion sleeve diameter, wherein the expansion section is integral with a neck section having a smaller diameter than the major diameter of the threaded rod and the step of welding involves welding an end of the neck section to the threaded rod.

2. The method of claim 1, wherein the expansion section is integral with a spacer section and the step of welding involves welding an end of the spacer section to the threaded rod.

3. The method of claim 2, wherein the expansion sleeve is provided between the spacer section and the expansion section before the spacer section is welded to the threaded rod.

4. The method of claim 2, wherein the spacer section has a diameter substantially equal to the major diameter or the minor diameter of the threaded rod.

5. The method of claim 1, wherein the ratio of the major diameter of the threaded rod to the neck section diameter is at least 1:0.5, optionally ranging up to about 1:0.9.

6. The method of claim 1, wherein the step of welding involves electrical resistance welding.

7. The method of claim 1, wherein the step of welding involves solid-state welding, optionally friction welding.

8. The method of claim 1, wherein at least one of the metal rod and the expansion section are formed of steel, optionally stainless steel or carbon steel.

9. An expansion anchor comprising a threaded rod part, an expansion section welded to an end of the rod part and an expansion sleeve which in use interacts with the expansion section for increasing the diameter of the expansion sleeve, wherein the expansion section is integral with a neck section having a smaller diameter than the major diameter of the threaded rod and an end of the neck section is welded to the threaded rod.

10. The anchor of claim 9, wherein the ratio of the major diameter of the threaded rod to the neck section diameter is at least 1:0.5, optionally ranging up to about 1:0.9.

11. The anchor of claim 9, wherein the expansion section is integral with a spacer section and an end of the spacer section is welded to the threaded rod.

* * * * *